United States Patent
Lewis

(10) Patent No.: US 10,120,701 B2
(45) Date of Patent: Nov. 6, 2018

(54) SYSTEM AND METHOD FOR TRANSFERRING DATA BETWEEN OPERATING SYSTEMS

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/560,829

(22) Filed: Dec. 4, 2014

(65) Prior Publication Data

US 2015/0160881 A1 Jun. 11, 2015

Related U.S. Application Data

(60) Provisional application No. 61/912,431, filed on Dec. 5, 2013.

(51) Int. Cl.
*G06F 3/00* (2006.01)
*G06F 9/455* (2018.01)
*G06F 9/4401* (2018.01)
*G06F 9/54* (2006.01)

(52) U.S. Cl.
CPC ............ *G06F 9/455* (2013.01); *G06F 9/441* (2013.01); *G06F 9/543* (2013.01)

(58) Field of Classification Search
None
See application file for complete search history.

(56) References Cited

U.S. PATENT DOCUMENTS

| | | | |
|---|---|---|---|
| 8,195,624 B2 | 6/2012 | Yang | |
| 2008/0109832 A1* | 5/2008 | Ozzie | G06F 17/24 719/329 |
| 2012/0011509 A1* | 1/2012 | Husain | G06F 9/5088 718/1 |
| 2014/0173295 A1* | 6/2014 | Goel | G06F 21/602 713/193 |
| 2015/0033225 A1* | 1/2015 | Rothman | G06F 9/45533 718/1 |
| 2015/0198998 A1* | 7/2015 | Nanda | G06F 1/3234 713/323 |

OTHER PUBLICATIONS

Android, Copy and Paste. Retrieved online at: https://developer.android.com/guide/topics/text/copy-paste.html. 13 pages.
(Continued)

*Primary Examiner* — Duc Doan
(74) *Attorney, Agent, or Firm* — McCarter & English, LLP; John S. Curran

(57) ABSTRACT

Mechanisms for moving data between different operating systems in a dual OS computing device are discussed. More particularly, embodiments of the present invention utilize the clipboard facilities supported by the operating systems, along with firmware and helper software in each OS, to move data back and forth when switching between an active and inactive operating system. The clipboard contents are preserved in non-volatile storage that is not lost across the sleep-state transitions used to switch operating systems. Helper software analyzes the clipboard contents being copied and converts them into a format recognized by the current operating system and its applications.

20 Claims, 3 Drawing Sheets

(56) References Cited

OTHER PUBLICATIONS

Chirgwin, Sysadmins hail Windows Server 2012 R2's killer . . . clipboard? Cut and paste between VMs wins spontaneous applause. Retrieved online at: http://www.theregister.co.uk/2013/09/05/sysadmins_hail_server_2012_r2s_killer_app/. 2 pages. (2012).
Microsoft, Clipboard. Retrieved online at: https://msdn.microsoft.com/en-us/library/windows/desktop/ms648709(v=vs.85).aspx. 5 pages. (2018).

* cited by examiner

SYSTEM AND METHOD FOR TRANSFERRING DATA BETWEEN OPERATING SYSTEMS

RELATED APPLICATION

This application is related to, and claims the benefit of, U.S. Provisional Patent Application No. 61/912,431 entitled "System and Method for Transferring Data Between Operating Systems", filed Dec. 5, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons such as switching operating systems in a dual OS computing device.

Some computing devices are configured to allow switching between two or more operating systems. Computing devices equipped with two independent operating systems may be referred to as dual OS systems. Conventionally, in such a dual OS computing device, the computing device is required to suspend operation and either power off or hibernate while the current operating system is shut down, the computing device is reset and the other operating system is loaded.

BRIEF SUMMARY

Embodiments of the present invention provide mechanisms for moving data between different operating systems in a dual OS computing device. More particularly, embodiments of the present invention utilize the clipboard facilities supported by the operating systems, along with firmware and helper software in each OS, to move data back and forth when switching between an active and inactive operating system. The clipboard contents are preserved in non-volatile storage that is not lost across the system sleep-state transitions used to switch operating systems. Helper software analyzes the clipboard contents being copied and converts them into a format recognized by the current operating system and its applications.

In one embodiment, a computer-implemented method for copying data between an active and inactive OS in a dual-OS computing device includes identifying an initiation of a switch of operating systems in the computing device from an active first OS to an inactive second OS and copying the data from a clipboard available to the first OS to a non-volatile storage location based on the identifying of the initiation of the switch. The copying of the data to the non-volatile storage location is performed by a first agent operating while the first OS is active before the switch of operating systems. The method further performs the switch of the operating systems using a sleep-state transition so that the first OS becomes inactive and the second OS becomes active. A second agent copies the data while the second OS is becoming active from the non-volatile storage location to a clipboard available to the second OS.

In another embodiment, a dual-OS computing device equipped with a first OS and a second OS that is configured to transfer data between the first OS and the second OS includes a processor, volatile memory able to hold an active first OS and a first agent operable while the first OS is active. The first agent is configured to copy data from a clipboard available to the first OS to a non-volatile storage location based on an identification of an initiation of a switch of operating systems in the computing device from the active first OS to an inactive second OS. The computing device also includes non-volatile storage holding firmware that is configured to perform the switch of the operating systems using a sleep-state transition so that the first OS becomes inactive and the second OS becomes active. Additionally, the computing device includes a second agent configured to copy data while the second OS is becoming active from the non-volatile storage location to a clipboard available to the second OS.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
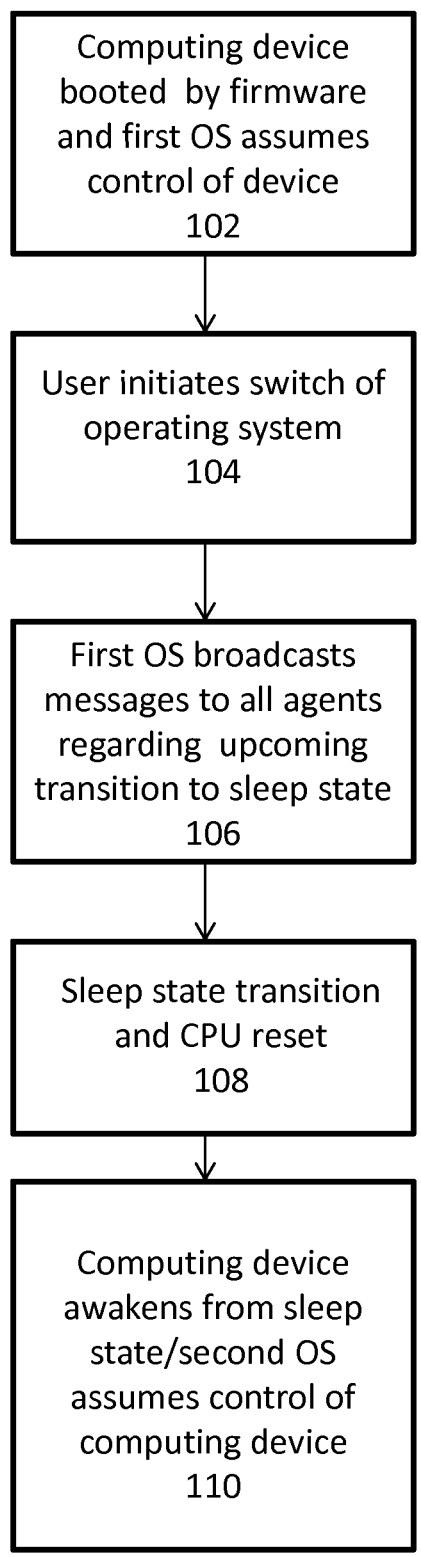
FIG. 1 (prior art) depicts an exemplary conventional sequence of steps performed to switch between an active and inactive operating system in a dual OS computing device.

During a boot sequence for a computing device, an operating system (OS) for the computing device is loaded into volatile memory such as Random Access Memory (RAM) and takes control of operation of the computing device following the completion of the boot sequence. Some computing devices are equipped with more than one operating system and allow a user of the computing device to subsequently switch the active operating system to a different operating system. Switching between the operating systems typically requires either a shut down of the computing device or a sleep state transition, In either case, as a result of such a switch between operating systems, data that was previously available to applications executing in the first (active) operating system that is being deactivated is lost and is not available to applications that will execute in the second operating system that is being activated.

Embodiments of the present invention provide a mechanism for transferring data between an active and inactive operating system in a dual OS computing device. More particularly, embodiments utilize the clipboard facilities that are usually supported by the different types of operating systems. For example, both Windows™ and Android™-based systems provide their own version of a clipboard. The clipboards of the respective operating systems, along with firmware and helper software in each OS, are used by embodiments to move data between applications in the different operating systems. The clipboard contents are preserved in non-volatile storage that is not lost across system sleep state transitions. Helper software analyzes the clipboard contents and converts them into a format recognized by the current operating system and its applications.

In systems where multiple operating systems are installed, the users may want to switch between operating systems. In addition, the users may want to copy data between applications in the different operating systems. However, in cases where the switch involves a complete transition from one operating system to another, there conventionally has been no easy way to communicate this data between the applications in the different operating systems because data from a first OS is lost as part of the system state transition used to switch to the second OS. In addition, the data formats supported by one operating system and its applications may not be compatible with those supported in the other operating system or its applications. Embodiments of the present invention provide a mechanism for transferring data from an application in a first active operating system environment to an application that will be executed in a currently inactive operating system environment while also ensuring that the data is properly formatted for the different operating system and application.

As noted above, the switch between operating systems in a dual OS computing device frequently requires a sleep state transition. There are different types of defined sleep states. For example, the Advanced Configuration and Power Interface (ACPI) specification defines a standard for device configuration and power management to be implemented by the operating system (OS) in computing devices. The ACPI standard defines four global power states for computing devices running from G0 (working with the monitor off) to G3 (mechanical off). The standard also defines six sleep states within these global states ranging from S0 (on) to S5 (off). The sleep-states describe gradually greater degrees of power savings and greater lengths of time needed to make the system available to a user. For example a computing device in an S3 power state is saving more power than a computing device in an S1 state while a system in an S5 state requires more time to respond to a user input command than a system in an S3 power state. In an ACPI-compliant computing device, an operating system controls the transition of the computing device between sleep-states by writing a specific "sleep value" to a sleep register.

The six sleep-states defined by the ACPI specification are:
S0: On (not sleeping) (within the G0 power state).
S1: The S1 sleeping state is a low wake latency sleeping state. In this state, no system context is lost (CPU or chipset) and the hardware maintains all system context.
S2: The S2 sleeping state is a low wake latency sleeping state. This state is similar to the S1 sleeping state except that the CPU and system cache context is lost (the OS is responsible for maintaining the caches and CPU context). Control starts from the processor's reset vector after the wake event.
S3: The S3 sleeping state is a low wake latency sleeping state where all system context is lost except system memory. CPU, cache, and chipset context are lost in this state. Hardware maintains memory context and restores some CPU and L2 configuration context. Control starts from the processor's reset vector after the wake event.
S4: The S4 sleeping state is the lowest power, longest wake latency sleeping state supported by ACPI. In order to reduce power to a minimum, it is assumed that the hardware platform has powered off all devices. Platform context is maintained. The S1-S4 sleep states are divisions occurring within the G1 (sleeping) global power state.
S5: Soft Off State. The S5 state is similar to the S4 state except that the OS does not save any context. A power supply unit supplies power to allow a return to the S0 state. The system is in the "soft" off state and requires a complete boot when it wakes. Software uses a different state value to distinguish between the S5 state and the S4 state to allow for initial boot operations within the BIOS to distinguish whether or not the boot is going to wake from a saved memory image. The S5 soft off state occurs within the G2 global power state. The G3 (mechanical off) power state differs from the G2 power state in that the computer system's power supply unit no longer supplies power as the power has been removed from the system via a mechanical switch.

In an ACPI-compliant computing device a "sleep control register" is an I/O register defined in a Fixed ACPI Description Table (FADT). A FADT is an ACPI-defined table which describes a number of fixed hardware resources, including a Sleep Control Register. Conventionally, in order to trigger a sleep-state transition, the operating system checks the address of a sleep control register defined in the FADT and writes a sleep type value associated with a desired sleep-state to the address. The ACPI specification defines different values that should be written to the SLP_TYP field of the PM1 Control or Sleep Control register, based on the sleep-state to which the operating system desires to transition. When switching between operating systems in a dual OS computing device, the S3, S4 or S5 sleep states are typically used.

FIG. 1 depicts an exemplary conventional sequence of steps performed to switch between an active and inactive operating system in a dual OS computing device. A dual OS computing device is booted by the system firmware and a first OS assumes control of the computing device at the end of the boot sequence (step 102). Subsequently, while the computing device is under control of the first OS, a user initiates a switch of operating systems (step 104). The manner of initiating the OS switches may vary and are well-known. For example, the user may initiate the OS switch using either a keystroke or user-interface action and the first active OS behaves as if it was performing a normal sleep-state transition. More particularly, the first OS may broadcast messages to all agents (drivers, daemons, etc.) to indicate that it is about to transition into a sleep state (an S3, S4 or S5 sleep state) (step 106). The S3, S4 and S5 sleep states provide different levels of data retention. Among these levels of data retention, the S3 sleep state indicates that the contents of system RAM are maintained while in the sleep state. The S4 sleep state indicates that the contents of system RAM are copied to non-volatile storage, such as flash or a hard drive. It should be noted that clipboard contents may or may not be in memory at the time of an S4 sleep-state transition, and the format would be proprietary to the operating system and/or application. As a result, the S4 storage is not a reliable means for storing the data in such a way that it can be retrieved by another operating system. The S5 sleep state indicates that all system RAM contents are lost. S3 sleep state transitions, in particular, have traditionally encountered trouble in dual-OS systems switching operating systems because the first OS often maintains a cached file system data that is not available to the second OS. After sending out the messages, the first OS completes its sleep-state transition and the system/CPU is reset returning control to the firmware (step 108). The firmware executes following the reset and awakens the computing device from the sleep state turning control over to the second OS at the end of the sequence (step 110). During the wake process the firmware may load the second operating system into memory if it is not already resident in memory.

Figure 2:
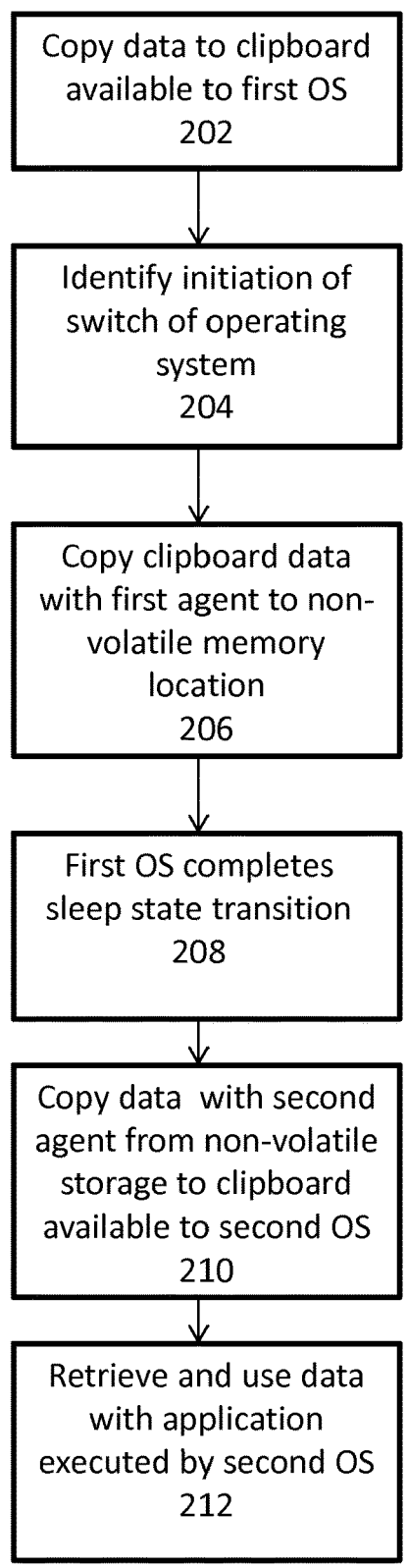
FIG. 2 depicts an exemplary sequence of steps performed by an embodiment of the present invention to copy data between an active and inactive operating system.

Embodiments of the present invention supplement the system sleep state transition between operating systems so that data from applications executed by a first OS that is being deactivated may be preserved for applications executed by a second OS that is being activated. FIG. 2 depicts an exemplary sequence of steps performed by an embodiment of the present invention to copy data between an active and inactive operating system. The sequence begins with data being copied to the clipboard available to a currently active first OS (step 202). The clipboard is meant as a temporary repository for data which allows the data to be easily transferred from one application or application window to another (within the same operating system). The methods by which data is copied to and retrieved from the clipboard are well known for each operating system. The format and types of data supported by the clipboard vary, but may include text, graphical images in various formats, HTML, rich text format (RTF), entire files or references to files, and other formats and types of data. The user can initiate the action to copy data to the clipboard in various ways including through the use of keyboard shortcuts (e.g. Ctrl-C, Ctrl-X), menus or screen buttons.

Continuing with the description of FIG. 2, after the user has initiated the OS switch, the OS broadcasts messages to all agents (drivers, daemons, etc.) to indicate that it is transitioning into one of the previously mentioned sleep states. A first agent operating in the current active first OS identifies the upcoming switch based upon one of the messages and based on that identification, retrieves the contents of the clipboard available to the first OS, and copies the data into non-volatile storage (step 206). In some cases, when the clipboard data is merely a reference to a file, the actual file may be copied into non-volatile storage. For S3 sleep state transitions, "non-volatile storage" has a different meaning in this context than normal as it may also include a piece of system RAM that is shared by the agents in the different OS instances. For S4 and S5 sleep state transitions, "non-volatile storage" is a form of data storage which is retained during a system reset. An S3 sleep state may also use the same types of non-volatile storage as the S4 and S5 instances. The non-volatile storage may include a region in a flash device, an EFI variable, a file, a file in a separate partition or some other type of non-volatile storage.

Subsequently, the OS completes its sleep state transition and the system is reset, giving control back to the firmware (step 208). The firmware either returns to the second OS using the Firmware ACPI Control Structure (for S3 sleep states) or via a boot to the second OS (for S4 or S5 sleep states). During the resume process (S3) or the boot process (S4 or S5), a second OS agent in the second operating system retrieves the data previously saved in the non-volatile storage location, converts it into a format understood by the second operating system's clipboard facilities and updates the second operating system's clipboard (step 210). This conversion may be done based on encoded information by the first OS, since the clipboard facility for each OS typically contains data type description information, such as the MIME metadata commonly used in Android, stored along with the clipboard data itself. Alternatively, the agent running under the first OS may alternately have earlier converted the data into a common format such as MIME encoding or (for graphic images) PNG or any other common industry standard encoding format, prior to saving the data. In both cases, the agent in the second OS is responsible for making sure that the data is converted into format(s) recognized by the second OS. This converting may include: conversion between text encoding schemes (for example ASCII or Unicode or rich-text format), graphics and video encoding schemes (for example PNG, BMP, JPEG, MP4, AVI), or between proprietary application-specific formats (for example .doc, .ppt). The data conversion may also include the task of converting a first OS format (for example .png) to more than one second OS format (for example .bmp and .gif), if the second operating system's clipboard capabilities allow multiple formats to be presented simultaneously (as in Windows™). The data may subsequently be retrieved from the clipboard, programmatically via an API, with the keyboard (e.g.: Ctrl-V) or with a user-interface (e.g.: paste), for use by an application under control of the second OS (step 212).

Figure 3:
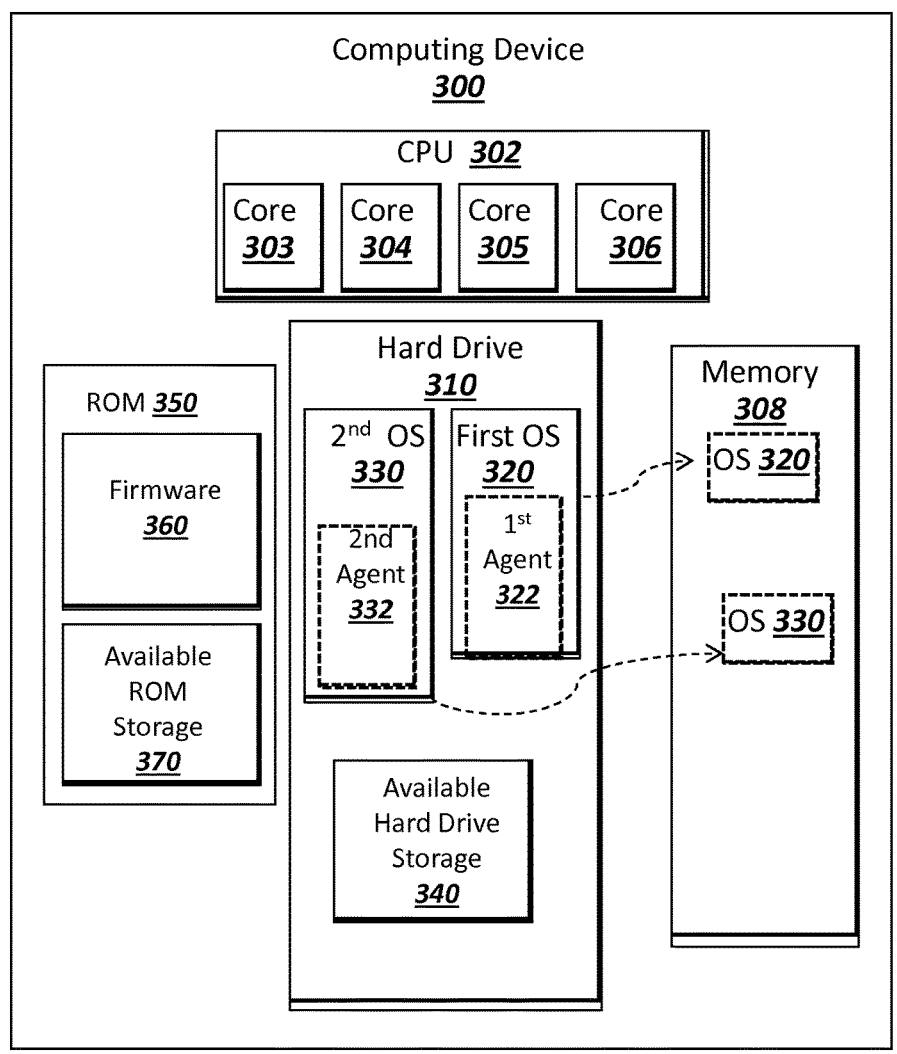
FIG. 3 depicts an exemplary environment suitable for practicing an embodiment of the present invention.

FIG. 3 depicts an exemplary environment suitable for practicing an embodiment of the present invention. A computing device 300 includes a CPU 302 used to process instructions. The CPU 302 may include multiple cores such as cores 303-306. The computing device 300 may be a PC, laptop computer, tablet computing device, server, smartphone or some other type of computing device supporting the use of multiple operating systems. The computing device 300 may also include a memory 308 such as Random Access Memory (RAM). The computing device 300 may include a first OS 320 (such as Windows™) and a second OS 330 (such as Android™). It will be appreciated that other operating systems in addition to or in place of Windows™ and Android™ may be utilized by the computing device 300 without departing from the scope of the present invention. The first OS 320 and second OS 330 may be stored on a hard drive 310 or other non-volatile storage that is in, or in a location in communication with, computing device 300 and may respectively be loaded into memory 308 as part of one or more boot processes performed by the computing device.

The computing device 300 may also include ROM 350. ROM 350 may be a Flash ROM device. ROM 350 may include firmware 360 as described above that is operable at different points of the computing device's operation. In some cases the system design may incorporate multiple ROM devices holding firmware. Firmware 360 may be operable during a sleep state transition and may be used to switch operating systems from active to inactive in computing device 300. Firmware 350 may also be operable when computing device 300 is executing in a normal operation mode under control of the first OS 320 or second OS 330. ROM 350 may include available ROM storage 370 that is used to hold data copied from a clipboard available to first OS 320 in advance of a sleep state transition as described above that occurs as part of a switch of operating systems. Data stored in available ROM storage 370 by the agent for the first operating system 322 may be retrieved by an agent for a second operating system 332 and copied to a clipboard available to the second operating system 230 as part of the activation process for the second operating system. Alternatively, data copied from the clipboard in the first operating system may be stored in and retrieved from available hard drive storage 340. It will be appreciated that the data copied from the clipboard available to the first operating system by an embodiment of the present invention may be stored in, and retrieved from, more than one non-volatile storage location.

It will be further appreciated that other embodiments of the present invention in addition to those specifically described herein are within the scope of the present invention. For example, certain data types or data sources in the first OS may be allowed to be copied only if the system is operated by a user of sufficient privilege. In another embodiment, the privilege may be further qualified by the specific application from which the clipboard data came.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computer-implemented method for copying data between an active and inactive operating system (OS) in a dual-OS computing device, comprising:
    identifying a user initiation of a switch of an operating system in the computing device from an active first OS to an inactive second OS;
    copying data from a first clipboard available to the first OS to a non-volatile storage location based on the identifying of the initiation of the switch, the copying of the data to the non-volatile storage location performed by a first agent operating while the first OS is active before the switch;
    performing the switch of the operating systems using a sleep-state transition so that the first OS becomes inactive and the second OS becomes active; and
    copying data while the second OS is becoming active during the sleep-state transition from the non-volatile storage location to a second clipboard available to the second OS, the copying of the data to the second clipboard available to the second OS performed by a second agent, wherein the sleep-state transition invokes an S3 sleep-state and the non-volatile storage location includes system RAM shared by the first agent and the second agent.

2. The method of claim 1, further comprising:
    converting the data copied from the first clipboard available to the first OS to a format recognizable by the second OS prior to its being copied to the second clipboard available to the second OS.

3. The method of claim 2, further comprising:
    converting the data based on encoded information about the first OS, the converting performed by the second agent.

4. The method of claim 2, further comprising:
    converting the data with the first agent to a common format before saving the data to the non-volatile storage location.

5. The method of claim 2 wherein the converting is between at least one of text encoding schemes, graphic encoding schemes and video encoding schemes.

6. The method of claim 2 wherein the converting is between proprietary application-specific formats.

7. The method of claim 2, further comprising:
    converting the data from a first format supported by the first OS to more than one format when the second clipboard available to the second OS allows multiple formats to be presented simultaneously.

8. The method of claim 1 wherein the copying of data from the first clipboard available to the active first OS to a non-volatile storage location is only allowed if the computing device is operated by a user of sufficient privilege.

9. The method of claim 1 wherein the data from the first clipboard available to the active first OS is a reference to a file, and further comprising:
    copying the file referred to by the reference to the non-volatile storage location.

10. A non-transitory medium holding computer-executable instructions for copying data between an active and inactive operating system (OS) in a dual-OS computing device, the instructions when executed causing the computing device to:
    identify a user initiation of a switch of an operating system in the computing device from an active first OS to an inactive second OS;
    copy data from a first clipboard available to the first OS to a non-volatile storage location based on the identifying of the initiation of the switch, the copying of the data to the non-volatile storage location performed by a first agent operating while the first OS is active before the switch;
    perform the switch of the operating systems using a sleep-state transition so that the first OS becomes inactive and the second OS becomes active; and
    copy data while the second OS is becoming active during the sleep-state transition from the non-volatile storage location to a second clipboard available to the second OS, the copying of the data to the second clipboard available to the second OS performed by a second agent, wherein the sleep-state transition invokes an S3 sleep-state and the non-volatile storage location includes system RAM shared by the first agent and the second agent.

11. The medium of claim 10 wherein the instructions when executed further cause the computing device to:
    convert the data copied from the first clipboard available to the first OS to a format recognizable by the second OS prior to its being copied to the second clipboard available to the second OS.

12. The medium of claim 11 wherein the instructions when executed further cause the computing device to:
    convert the data based on encoded information about the first OS, the converting performed by the second agent.

13. The medium of claim 11 wherein the instructions when executed further cause the computing device to:
    convert the data with the first agent to a common format before saving the data to the non-volatile storage location.

14. The medium of claim 11 wherein the converting is between at least one of text encoding schemes, graphic encoding schemes and video encoding schemes.

15. The medium of claim 11 wherein the converting is between proprietary application-specific formats.

16. The medium of claim 11 wherein the instructions when executed further cause the computing device to:
   convert the data from a first format supported by the first OS to more than one format when the second clipboard available to the second OS allows multiple formats to be presented simultaneously.

17. The medium of claim 10 wherein the copying of data from the first clipboard available to the active first OS to a non-volatile storage location is only allowed if the computing device is operated by a user of sufficient privilege.

18. The medium of claim 10 wherein the data from the first clipboard available to the active first OS is a reference to a file, and wherein the instructions when executed further cause the computing device to:
   copy the file referred to by the reference to the non-volatile storage location.

19. A dual-OS computing device equipped with a first operating system (OS) and a second OS that is configured to transfer data between the first OS and the second OS, comprising:
   a processor configured to execute computer-executable instructions including firmware and instructions for the first OS and the second OS,
   a volatile memory able to hold an active first OS;
   a first agent operable while the first OS is active, the first agent configured to copy data from a first clipboard available to the first OS to a non-volatile storage location based on an identifying of a user initiation of a switch of an operating system in the computing device from an active first OS to an inactive second OS;
   non-volatile storage holding the firmware, the firmware when executed configured to perform the switch of the operating systems using a sleep-state transition so that the first OS becomes inactive and the second OS becomes active;
   a second agent, the second agent configured to copy data while the second OS is becoming active during the sleep-state transition from the non-volatile storage location to a second clipboard available to the second OS,
   wherein the sleep-state transition invokes an S3 sleep-state and the non-volatile storage location includes system RAM shared by the first agent and the second agent.

20. The computing device of claim 19 wherein the data copied from the first clipboard available to the first OS is converted to a format recognizable by the second OS prior to its being copied to the second clipboard available to the second OS.

* * * * *